United States Patent [19]

McGehee

[11] Patent Number: 4,848,200
[45] Date of Patent: Jul. 18, 1989

[54] SAW GUIDE LUBRICATING SYSTEM

[75] Inventor: Ronald W. McGehee, Redwood Valley, Calif.

[73] Assignee: Ukiah Machine & Welding, Inc., Ukiah, Calif.

[21] Appl. No.: 109,352

[22] Filed: Oct. 15, 1987

[51] Int. Cl.⁴ .............................................. B27B 5/29
[52] U.S. Cl. ...................................... 83/169; 83/171; 83/821
[58] Field of Search .............. 83/169, 170, 171, 508.3, 83/821, 425.3, 824

[56] References Cited

U.S. PATENT DOCUMENTS

| | | | |
|---|---|---|---|
| 3,557,848 | 1/1971 | Wright | 83/169 |
| 3,593,763 | 7/1971 | Neild | 83/169 |
| 3,623,520 | 11/1971 | Neild | 83/169 |
| 3,918,334 | 11/1975 | Wilcox | 83/13 |
| 4,290,330 | 9/1981 | Washio et al. | 83/820 |
| 4,466,323 | 8/1984 | Salomonsson | 83/821 |
| 4,635,513 | 1/1987 | McGeehee | 83/169 |
| 4,715,254 | 12/1987 | Degan | 83/169 |

Primary Examiner—Frank T. Yost
Assistant Examiner—Eugenia A. Jones
Attorney, Agent, or Firm—Townsend and Townsend

[57] ABSTRACT

A saw guide system having a mechanism for applying an oil film to individual saw blades includes saw guide blocks having either common or separate distribution networks for oil and water. The saw guide block has an open chamber extending through the guide block for receiving and distributing the oil and water from the distribution networks onto the saw blades. The use of a lubricating film greatly reduces the accumulation of heat in the sawing system and allows operation of the sawing system without the introduction of cooling water.

12 Claims, 3 Drawing Sheets

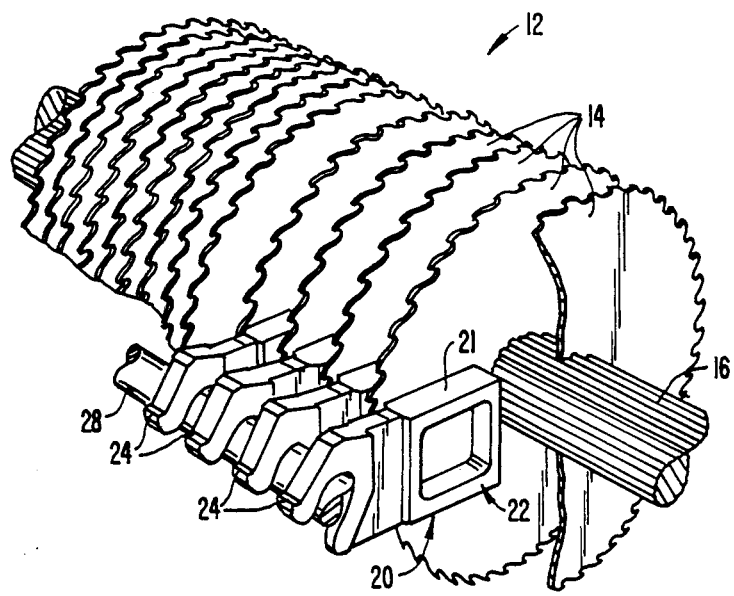
FIG._1.
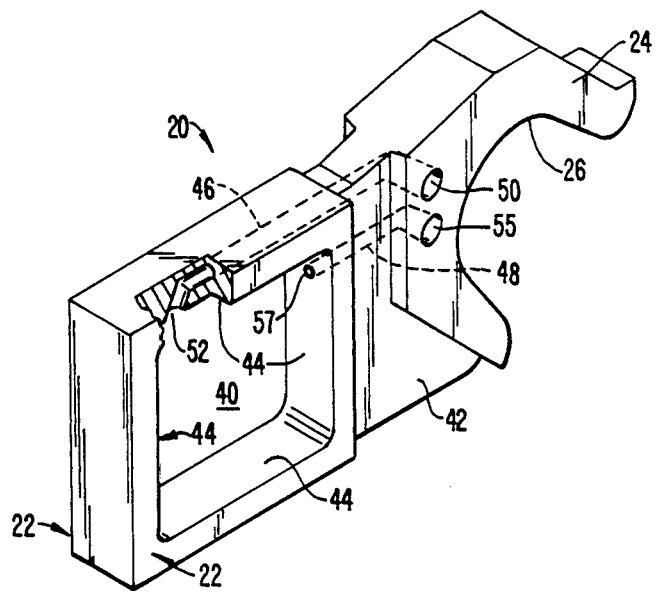
FIG._2.

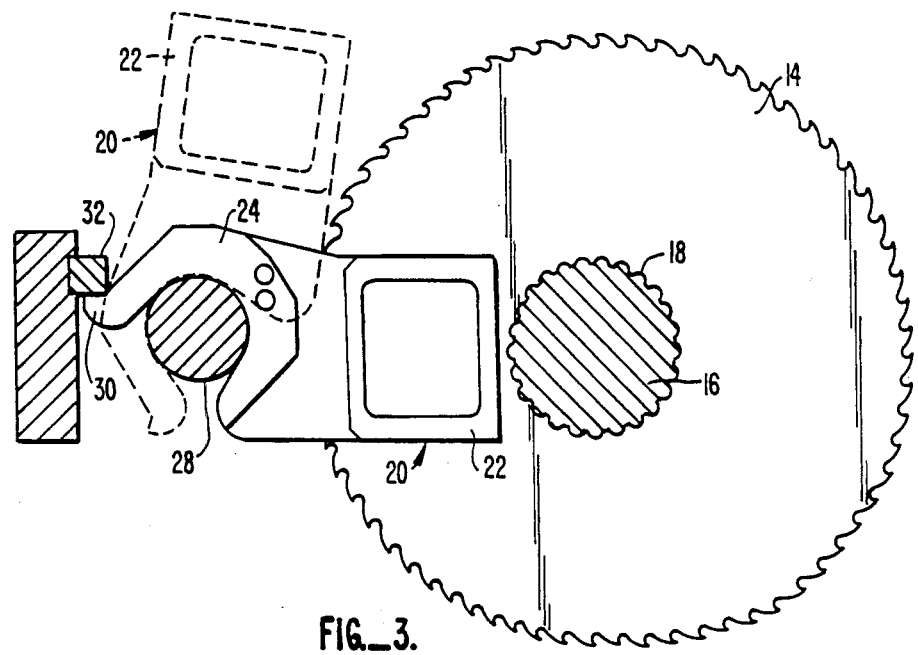
FIG._3.
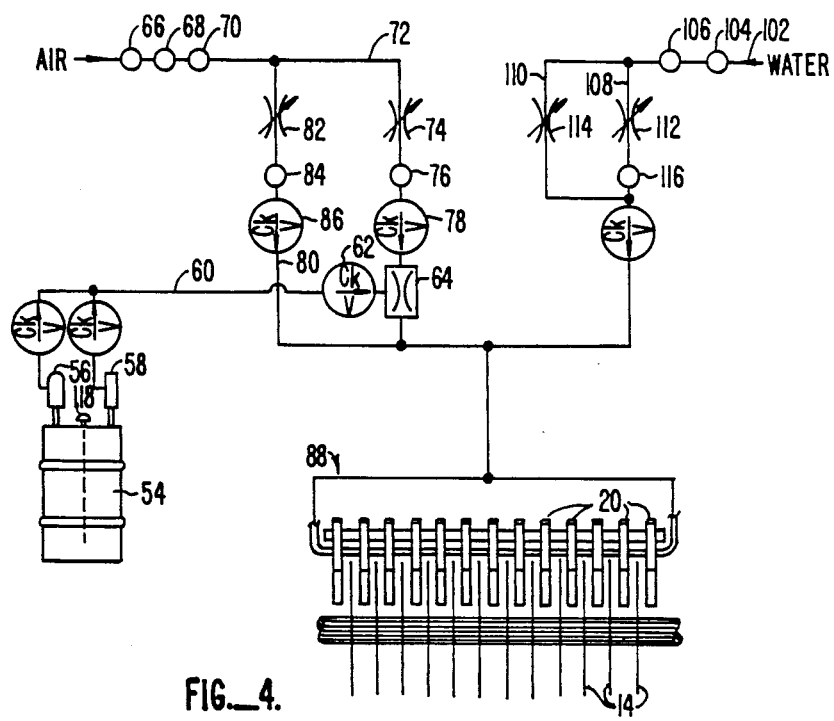
FIG._4.

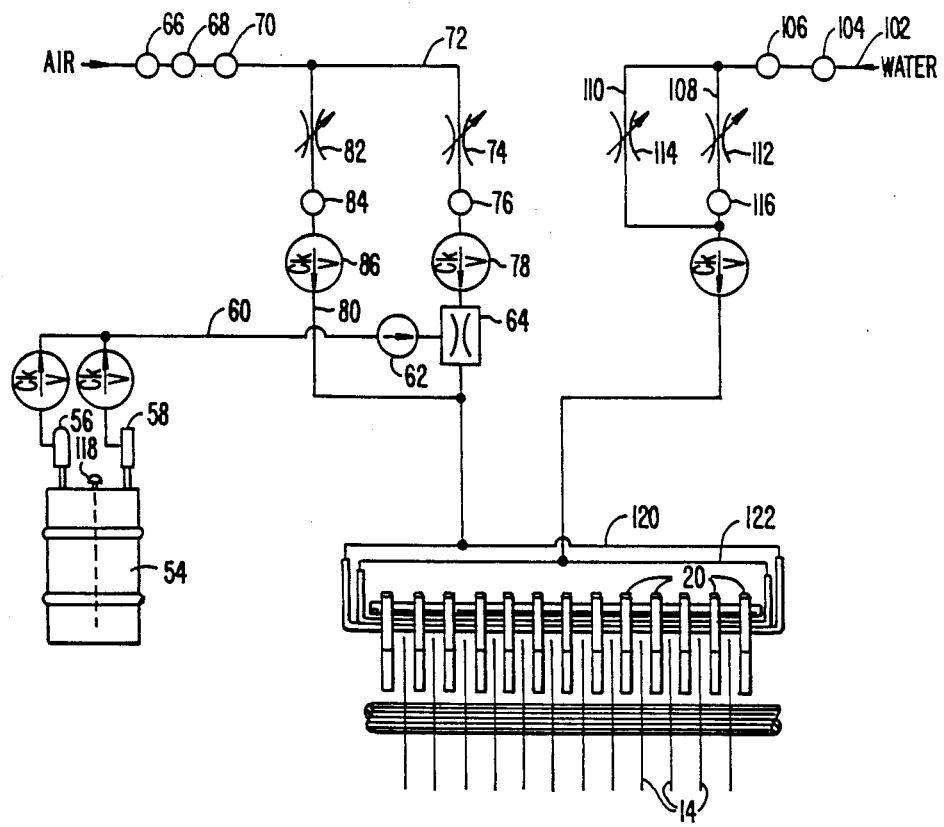
FIG._5.
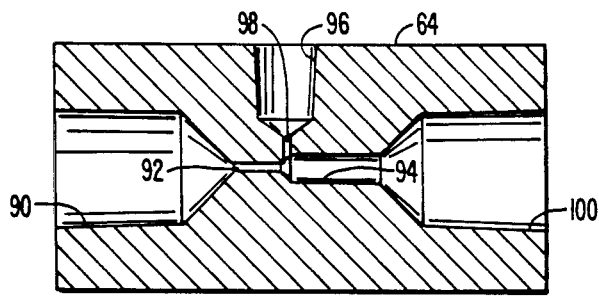
FIG._6.

SAW GUIDE LUBRICATING SYSTEM

BACKGROUND OF THE INVENTION

The use of multiple blade saw systems is widespread in the lumber industry. Certain types of multiple blade saw systems use very thin circular saw blades. Such thin saw blades, however, require saw guide systems to prevent warping and deformation of the blade during use. Many existing guiding systems use large babbitt saw guides which typically require large amounts of cooling water to cool both the saw blades and saw guides while the saws are cutting.

An alternative approach for preventing excess accumulation of heat in multiple saw assemblies, with little or no water, is described in U.S. Pat. No. 4,635,513 (incorporated herein by reference). This system employs a plurality of individual saw guide blocks, each of which include separate channels to run oil mist and water mist to the saw blade. It was found that by applying very small amounts of lubricating oil through the saw guides onto the saw blade, the need to apply water to the blades for cooling is greatly reduced or eliminated altogether. The use of such systems has been widely adopted.

The system described in U.S. Pat. No. 4,635,513 does, however, suffer from one particular problem in that the small orifices in the saw guide tend to plug with very fine saw dust which stops the flow of lubricant and coolant to the saw blade. Such plugging can cause the saw to overheat resulting in damage to both the saw guide and the saw itself. Additionally, even partial plugging can cause pressure imbalances on opposite sides of the guide, which imbalances can cause increased saw friction and in the worst case, misalignment of the adjacent blade.

A further problem with saw guide systems in general is that the guide blocks require frequent changing, typically after only about 40 hours. The introduction of oil onto the saw guides, as disclosed in the 4,635,513 patent, has significantly increased their life, typically to 100 hours or longer; however, the guides must still be changed once a week or more frequently.

For the above reasons, it would be desirable to provide a saw guide block which is capable of applying oil without the plugging associated with the prior blocks discussed above. It would be particularly desirable if such guide blocks were also to enjoy extended useful lives in order to reduce costs associated with frequent changes.

SUMMARY OF THE INVENTION

The present invention provides an improved saw guide block for use in saw guide systems for supporting and cooling circular saws in multiple saw systems. The saw guide includes an open chamber which receives a continuous supply of oil mist. The oil mist is injected into the chamber under conditions such that a swirling or vortex of the oil mist is created. It has been found that such injection provides for a highly uniform application of oil film on the saw blades. Moreover, the oil passages within the guide block are substantially free from plugging so that downtime to clean the guide blocks is substantially eliminated. Because of the improved lubrication, and decreased chance of failure, it has been possible to form the bearing surfaces of such guide blocks out of very hard materials which can last from 5,000 to 10,000 hours, or more. Prior systems required the use of softer, more lubricous materials which would wear excessively after several hundred hours of operation, or less. Additionally, the lack of plugging in the open chamber assures an even pressure distribution on both sides of the saw guide, avoiding the problems associated with a pressure imbalance as described above.

BRIEF DESCRIPTION OF THE DRAWINGS

FIG. 1 is a perspective view of a multiple blade saw assembly employing the saw guide system of the present invention, with the saw guides being spaced-apart for simplification.

FIG. 2 is an isometric view of the improved saw guide block of the present invention with dotted lines to show the internal fluid passages for distributing oil and water.

FIG. 3 is a front elevational view of a saw guide block mounted on a guide rack and shown adjacent a saw blade.

FIG. 4 is a schematic diagram showing the oil and water connections to a common oil/water distribution network in the saw guide block of the present invention.

FIG. 5 is a schematic diagram showing the oil and water supply systems for a saw guide system having separate oil and water distribution networks.

FIG. 6 is a sectional view of a venturi suitable for atomizing oil in an air stream for application to saw blades in the present invention.

DESCRIPTION OF THE PREFERRED EMBODIMENT

Referring to FIG. 1, a multiple blade saw assembly 12 includes twelve individual saw blades 14 mounted on a common drive shaft 16. The outer surface of the drive shaft 16 includes axially aligned serrations which engage a similar pattern of serrations in the center hole 18 (FIG. 3) of the saw blade 14. In this way, slippage of the saw blade 14 on the drive shaft 16 is prevented.

The saw blades 14 are axially spaced apart on the drive shaft 16 to perform a number of parallel cuts on the lumber being sawed. Individual guide blocks 20 include bearing blocks 21 which are interdigitated between adjacent saw blades 14, each bearing block including a pair of bearing surfaces 22 lying immediately adjacent to the face of adjacent saw blades 14. Clearance between the bearing surfaces 22 of the bearing blocks 21 and the saw blades 14 will typically be in the range from about 0.001 to 0.004 inches. Heretofore, the bearing surfaces 22 were made of a low friction material in order to reduce heat generation as the blades are rotated. As described in more detail hereinafter, the present invention allows the bearing surfaces to be constructed of harder, longer lasting materials which are generally characterized by higher friction coefficients.

Each saw guide block 20 includes a mounting bracket 24 at the end opposite the bearing surfaces 22. The mounting bracket 24 defines a U-shaped clamp 26 (FIG. 2) which is received on a guide support rod 28. The mounting brackets 24 slidably receive the support rod 28 and may be individually raised from between the adjacent saw blades 14 by rotation in counterclockwise direction as illustrated in FIG. 3. Referring to FIG. 3, the guide blocks 20 are illustrated in their raised positions in broken line. The mounting bracket 24 includes a stop hook 30 which engages a block 32 fixedly mounted on the frame of the saw assembly 12. The guide block 20 in its raised position also rests against the block 32. Thus, the block 32 defines both the lowered and raised positions of the guide block 20.

The present invention comprises an improvement to the conventional saw guide system as disclosed in U.S. Pat. No. 4,635,513. Specifically, an improved design of b block 21 is provided for applying oil onto the individual saw blades 14.

Referring now to FIG. 2, each bearing block 21 includes an open chamber 40 extending between the bearing surfaces 22. The cross-sectional area of the chamber 40 (i.e., the area in the plane parallel to the bearing surfaces 22) will usually comprise at least about 40% of the area of each bearing surface 22, more usually being at least about 45%, and frequently being at least about 50% or more. The exemplary embodiment illustrated has a chamber area equal to about 55% of the bearing surface area.

The bearing block 21 is mounted on an extension member 42 attached to the mounting bracket 24. The mounting bracket 24 and extension member 42 are typically steel machined to the desired external dimensions and include certain internal passageways, as will be described in detail below. The bearing surfaces 22 are generally formed by casting onto the extension member 42. Heretofore, bearing materials have been low friction metals, glasses or other materials which may be easily molded onto the inner member to the desired tolerances. As a result of the improved lubricating system disclosed herein, however, it is possible to use hard, abrasion-resistant bearing materials which would have previously been unacceptable for use in guide block construction. Such materials include, but are not limited to, chrome, ceramic, tungsten carbide and other high hardness materials. The use of such hard materials extends the useful life of the guide blocks significantly, up to as long as about 5,000 to 10,000 hours, or longer.

The geometry of the chamber 40 is not critical. As illustrated, the chamber has a generally square cross-section with four peripheral walls 44. The cross-section could also be rectangular, circular, triangular, or even irregular, so long as the minimum area ratio set forth above is met.

The mounting bracket 24, extension member 42, and bearing block 21 of the guide block 20 includes passages 46 and 48 for receiving and distributing oil and water, respectively, into chamber 40. In an alternate embodiment, a single passage (either 46 or 48) could be used for distribution of oil and/or an oil water mixture into the chamber. The use of separate passages, however, is preferred as it provides for maximum flexibility in operation.

The oil fluid passage 46 includes a transverse inlet port 50 at its inner end (proximate the mounting bracket 24) connected to an external oil source 54 (FIG. 5) which penetrates the entire width of the inner member 34. A nozzle 52 is disposed at the other end of passage 46. The nozzle 52 is preferably oriented at an acute angle to wall 44 so that the lubricating fluid into chamber 40 at an oblique angle. Preferably, the angle is in the range from about 30° to 60°. relative to the peripheral wall 44. By injecting the oil in at the preferred angle, a swirling motion or vortex is created which acts to distribute oil evenly across the surface of the sawblade as it is rotated.

The second passageway 48 also includes a transverse inlet port 55 at its inner end (proximate the mounting bracket 24) and terminates in a port 57 at its other end. The port will normally be provided with a nozzle to control the flow rate of the water therefrom. The orientation of the water flow is less critical than that of the oil and the port 57 is normally disposed to the plane of the wall 44 through which it penetrates.

The chamber 40 will normally be completely open from side-to-side as illustrated in FIG. 2. It would be possible to place a planar wall or partition (not shown) in the center of the chamber 40 lying generally parallel to the planes of the bearing surfaces 22. The partition would create two isolated chambers, and it would be necessary to bifurcate passages 46 and 48 so that oil and water could be delivered to both "half" chambers. The present invention contemplates such a divided construction even through it is not the presently preferred design. Also, the chambers 40 in the guide blocks 20 which are at the end of a gang of saws will have one opening of the chamber covered since there will be no saw to close the face.

The lubricating and cooling fluids consist of an oil mist and water mist. The oil mist enters guide block 20 through transverse port 50, travels along axial passage 46, and enters chamber 40 through nozzle 52 at a pressure of 20-50 PSI. When the oil mist enters chamber, a effect results due to the expansion of the gasses. Since the oil mist enters the chamber 40 at an acute angle relative to internal wall 44, a circular vortex of the mist is created inside the chamber. The lubricant or coolant passes from the chamber 40 onto saw blades 14 through the small gap between the guide block 20 and the saw blade 14, typically 0.003 inches. The lubricant and coolant are directed toward the center of rotation of the saw blade initially. As a result of the turning of the blade, the oil and water will migrate out towards the rim of the saw and assure an even distribution across the face of the saw. The circular motion of the oil mist or water mist inside chamber 40 further assures an even distribution of coolant and lubricant around the perimeter of the saw blade. This advanced lubricating and cooling system is much more effective- than the system disclosed in U.S. Pat. No. 4,635,513. Moreover, by using the open chamber to deliver the lubricant and coolant, the plugging problem is eliminated. Also, the improved lubricating system enables the use of harder and less abrasive guide materials which will last longer, typically several thousand hours.

It will be appreciated that while the preferred embodiment of the present invention employs separate lubricating oil and water distribution passages within the guide block 20, the present invention may also include a common distribution network for both the oil and the water. Each of these systems is described in more detail in connection with FIGS. 4 and 5.

Referring now to FIG. 4, the connection of lubricating oil and water to the saw guide system having a common oil and water distribution network within each saw guide block is illustrated. Oil is supplied in a drum 54 having both a high volume metering pump 56 and low volume metering pump 58. The outputs from both pumps 56 and 58 are manifolded into a common line 60 which feeds directly through a check valve 62 into a venturi 64. The venturi 64 acts to form an oil spray by means of air induction. An air supply passing through a filter 66, regulator 68 and lubricator 70 is provided to induce a spray through the venturi 64. Air is directed through line 72 and flow valve 74 into the venturi 64. A solenoid 76 is provided to allow remote operation of the system, and a check valve 78 prevents backflow of oil into the air system. A bypass airstream 80 is also provided with a flow controller 82, solenoid valve 84 and check valve 86. They bypass airstream 80 mixes with the output of the venturi 64 to carry the oil mist into distribution manifold 88.

Referring now to FIG. 6, the construction of oil induction venturi 64 will be described. The venturi includes an air inlet 90 which connects to a narrow axial passage 92, having a diameter in the range from about 0.06 to 0.09 inches. Passage 92 flares into a second axial passage 94, having a diameter in the range from about 0.18 to 0.25 inches. Oil inlet 96 connects to the flared transition between axial passages 92 and 94, via a connecting passage 98. The air carrying the atomized oil passage out of outlet port 100.

Water input into the distribution manifold 88 is also provided. A water source 102 is run through filter 104 and solenoid 106. The water is branched into lines 108 and 110, each of which is provided with a flow control valve 112 and 114 respectively. Typically, the flow control valve 114 will be set to deliver a relatively low flow rate of water, in the range from about 0.05 to 0.5 gpm, while the other flow control valve 112 set deliver a higher flow rate of water, in the range from about 0.5 to 1 gpm. A second water solenoid valve 116 is provided in line 108. In this way, a low water flow rate is achieved by actuating the first solenoid valve 106, while a high water flow rate is achieved by actuating both solenoid valves 106 and 116.

The distribution manifold 88 is connected to the saw guides 20 in the series. The saw guides 20 are substantially as illustrated in FIG. 2, except that only the, first fluid passage which includes transverse hole 50 and axial passage 46 is connected. The manifold 88 is connected through transverse port 50 to supply oil/water to each of the saw guides 20.

In operation, the oil supply drum 54 is filled with a suitable lubricating oil, typically a low viscosity synthetic polymer lubricant. The precise nature of the oil lubricant is not critical, although the lubricant should be non-flammable and non-toxic. A low level switch 118 is provided to automatically switch on the water system when the oil level is low and to remind the user when to refill tank 54. To start up the system, the air flow through solenoids 76 and 84 are initiated and both oil feed pumps 56 and 58 are started. As the saw blades 14 are rotated, the high volume start-up pump 56 delivers a sufficient amount of oil to provide a film on the blades which is about 0.001 to 0.003 inches thick, typically about 0.002 inches. Typically, this will require from about 1 to 20 cubic inches of lubricating oil, depending on the number and size of the saw blades 14. After the initial charge of lubricating oil has been introduced into the system, the high volume start-up pump 56 and the high volume air flow through solenoid 84 are shut off. The low volume oil flow through pump 58 and misting air through solenoid 76 are continued throughout normal operation of the system. The mist air to oil ratio should be adjusted to minimize oil consumption while allowing sufficient oil for lubrication. Typically, oil consumption is about 0.5 to 1.0 cubic inches per hour per saw blade, depending on of the saw blade.

The water system is provided only for emergencies or unusual operating conditions. If the saws become stuck in the wood, or if the wood contains high amounts of pitch, it will usually be necessary to apply cooling water. For emergency conditions, both the low water and high water solenoids (106, 116) are actuated to deliver sufficient water to cool the saw guide blocks. The low water flow through flow control valve 114 is provided to allow operation when oil is unavailable. The low water supply will be on at all times and the high water system will be turned on only when the saws are in use.

Turning now to FIG. 5, a dual oil/water manifold system will be described. The oil supply and water supply systems are identical to those just described for the single manifold system up until the point where oil manifold 120 and water manifold 122 are connected. The, oil manifold 120 connects into the oil inlet port 50 of the outermost saw guide block 20. The inlet ports 50 of each successive guide block 20 can then be connected by clamping adjacent mounting brackets 24 of the guide blocks 20 together so that the successive oil ports 50 are interconnected to define a single conduit to deliver oil to each of the guide blocks 20. Similarly, the water ports 50 are interconnected to form a single conduit to deliver water to each of the guide blocks 20. The operation of the two manifold system is essentially the same as that described before the single manifold system. The advantage o the dual manifold system is that the oil manifold and distribution network in each individual saw guide block will not be flushed with water each time the water system is used. This provides a substantial advantage since it allows immediate resumption of operation using the oil system.

While control may be accomplished manually, it is preferable to employ an automatic timing and switch controller. Conveniently, commercially available programmable logic controller having real time operation capability may be utilized. Alternatively, conventional drum rollers actuating solenoid outputs may also be utilized.

Although the foregoing invention has been described in some detail by way of illustration and example for purposes of clarity of understanding, it will be obvious that certain changes and modifications may be practiced within the scope of the appended claims.

What is claimed is:

1. An improved saw guide block for use with a source of lubricating and cooling fluids and a saw assembly, wherein the saw assembly includes a plurality of axially spaced-apart saws and a plurality of saw guide blocks with each saw guide block including at least one face capable of supporting a saw blade, said improvement comprising the saw guide block having an open chamber defined by a peripheral wall formed in at least one face, wherein the cross-sectional area of the chamber comprises at least about 45% of a bearing surface area provided by the guide block, and means for directing the lubricating and cooling fluid into the chamber at an acute angle to an internal wall of said chamber so that a vortex is created to evenly distribute lubricating and cooling fluid onto an adjacent saw blade, said means for directing being fluidly coupled to the sources of the fluid.

2. An improved saw guide block as in claim 1, wherein the open chamber extends between both faces of the guide block to form a single chamber open to both sides of the guide block.

3. An improved saw guide block according to claim 1, wherein said means to direct the lubricating and cooling fluids include first and second fluid inlet passages fluidly coupled to said lubricating and cooling fluid source.

4. An improved saw guide block according to claim 3, wherein said fluid inlet is a mist inlet.

5. An improved saw guide block according to claim 3, wherein said fluid inlet comprises a nozzle to control the flow rate of the fluid into said chamber.

6. An improved saw guide block according to claim 1, wherein said chamber has a rectangular shape.

7. An improved saw guide block according to claim 1, wherein said guide has a ceramic, chrome, or tungsten carbide surface.

8. An improved saw guide block for use with a source of lubricating and cooling fluids and a saw assembly, the saw assembly including axially spaced apart saw blades and a plurality of saw guide blocks mounted between the saw blades to support the saw blades, said improvement comprising the guide block including a through hole extending between the guiding surface to define a chamber therein, wherein the cross-sectional sectional area of the chamber comprises at least about 45% of a bearing surface area provided by the guide block, a fluid inlet passage opening into the chamber and fluidly coupled to the source of cooling and lubricating fluids, said fluid passage comprising a nozzle for directing the fluids at a predetermined pressure, said nozzle oriented at an acute angle to an internal wall of said chamber to direct the fluid into the chamber and resulting in a vortex which acts to distribute the fluid evenly across the surface of the saw blade.

9. An improved saw guide block according to claim 8, wherein said pressure is 20-50 PSI.

10. An improved saw guide block for use with a source of lubricating and cooling fluids and a saw assembly, the saw assembly including axially spaced apart saw blades and a plurality of saw guide blocks mounted between the saw blades to support the saw blades, said improvement comprising the guide block including a through hole extending between the guiding surface to define a chamber therein, wherein the cross-sectional area of the chamber comprises at least about 45% of a bearing surface area provided by the guide block, a first fluid inlet opening into the chamber and fluidly coupled to a first source of fluid and a second fluid inlet opening into the chamber and fluidly coupled to a second source of fluid, said first fluid inlet including a nozzle inlet to direct the fluid into the chamber at a predetermined pressure, said nozzle oriented at an acute angle to an internal wall of said chamber to direct the fluid into the chamber and resulting in a vortex which acts to distribute the fluid evenly across the surface of the saw blade.

11. An improved saw guide block according to claim 10, wherein said first source of cooling fluid is oil mist.

12. An improved saw guide block according to claim 10, wherein said second source of cooling fluid is water mist.

* * * * *